United States Patent
Fabris (10) Patent No.: US 6,439,587 B2
(45) Date of Patent: Aug. 27, 2002

(54) ADJUSTABLE REBOUND STOP FOR AXLE/SUSPENSION SYSTEMS

(75) Inventor: Eric W. Fabris, Akron, OH (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/812,544

(22) Filed: Mar. 20, 2001

Related U.S. Application Data (60) Provisional application No. 60/191,178, filed on Mar. 22, 2000.

(51) Int. Cl.⁷ .................................................. B60G 9/02
(52) U.S. Cl. .............................. 280/124.11; 267/64.15; 280/124.1; 280/124.116; 280/124.128; 280/124.157
(58) Field of Search ...................... 280/124.11, 124.1, 280/124.101, 124.102, 124.116, 124.128, 124.153, 124.157, FOR 159, FOR 168; 267/64.21, 64.28, 64.15

(56) References Cited

U.S. PATENT DOCUMENTS 3,362,758 A * 1/1968 Goerke et al.
4,763,953 A * 8/1988 Chalin

FOREIGN PATENT DOCUMENTS

| AU | 228986 | * 6/1960 | ........ 280/FOR 168 |
|----|--------|----------|----------------------|
| CA | 451948 | * 10/1948 | .............. 267/64.15 |

* cited by examiner

Primary Examiner—Eric Culbreth
(74) Attorney, Agent, or Firm—Buckingham, Doolittle & Burroughs, LLP; David P. Dureska (57) ABSTRACT

A stop assembly for predetermining the maximum downward travel distance or rebound of a vehicle axle/suspension system includes an adjustment cam. A chain for heavy-duty applications, or a woven nylon strap for lighter-duty applications, is immovably attached at its lowermost end to each suspension assembly beam of the axle/suspension system. An uppermost end of the chain is immovably attached to the cam, which in turn is pivotally captured in a bracket assembly immovably attached to the vehicle frame. An easily accessible adjustment bolt passes through the bracket assembly and bears on the cam, so that upon rotation of the bolt using a wrench or similar tool, the chain, and in turn the suspension assembly beam and the axle captured in the beam, can be selectively vertically repositioned by the pivoting cam to predetermine the maximum system rebound during vehicle operation.

6 Claims, 6 Drawing Sheets

ADJUSTABLE REBOUND STOP FOR AXLE/SUSPENSION SYSTEMS

This application claims the benefit of provisional application Ser. No. 60/191,178 filed Mar. 22, 2000.

BACKGROUND OF THE INVENTION

1. Technical Field

The invention relates to heavy-duty axle/suspension systems and specifically to rebound stops for such axle/suspension systems. More particularly, the invention is directed to a rebound stop for heavy-duty axle/suspension systems which is easily adjustable, thus making it simple to install and useful on a variety of axle/suspension systems without customization, and further which generally eliminates the need for replacement of the rebound stop and minimizes damage to shock absorbers of the axle/suspension system due to changes in the rebound distance after installation of the rebound stop.

2. Background Art

A heavy-duty vehicle such as a semi-trailer typically is equipped with at least one and usually more than one axle/suspension system. The axle/suspension systems are suspended from the frame of the vehicle. More specifically, each axle/suspension system conventionally is comprised of a pair of transversely spaced-apart trailing or leading arms or beams which capture an axle extending between the beams. One end of each of the beams is pivotally attached to a respective one of a pair of depending frame hangers using a pivot bolt or the like which passes through the hanger and a bushing assembly of the beam. The other end of each of the beams is attached to the frame via a respective one of a pair of air springs, each of which extends between and is attached to its respective beam and the bottom of the frame. A shock absorber typically also is attached to and extends between the beam and the frame.

During, normal operation of the vehicle, the beams of each axle/suspension system pivot about their bushing ends in upward and downward arcs of travel as the wheels attached to the axle encounter bumps and depressions, respectively, in the road over which the vehicle is traveling. Various components of the axle/suspension system, and in particular the beam bushing assemblies, the air springs and the shock absorbers, all cooperate in reacting the loads encountered by the vehicle wheels which are transferred to the two suspension assemblies of the axle/suspension system through the axle. The suspension assemblies, each of which generally comprises one of the beams and its associated air spring and shock absorber, serve to cushion the vehicle frame and ultimately minimizes undue wear and damage to the frame and any cargo being transported, and also makes the ride comfortable for passengers.

During maximum downward travel or full rebound of the suspension assemblies and axle, it is a function of the shock absorbers to act as a positive stop. Without such a stop, damage likely would occur at least to the air springs, and in severe cases to the beams and/or the vehicle frame. However, relying solely on the shock absorber as a positive rebound stop for its respective suspension assembly can significantly shorten the life of the shock absorber.

Therefore, it has been a common practice to install a rebound stop suspension assembly accessory to extend the life of the shock absorbers of the axle/suspension system by limiting the impact loads imparted on the shock absorbers. Such a rebound stop for limiting the downward travel of the axle/suspension system conventionally has taken the form of a woven nylon strap, or for heavy-duty applications, a chain. The strap or chain is attached at one of its ends to the beam or axle, usually adjacent to the air spring, and at the other of its ends to the vehicle frame.

Although such rebound stops operate satisfactorily, at least initially, when properly installed, a number of problems exist with prior art rebound stops due to the fact that they are non-adjustable. First, various axle/suspension systems have different distances between the beam and the vehicle frame as well as different rebound distances. Thus, each non-adjustable rebound stop must be customized for installation on a specific axle/suspension system application. Typically, such customization involves determining the proper rebound stop chain or strap length and locations of attachment for that chain or strap. Such customization often involves hit or miss experimentation if the non-adjustable rebound stop has not already been designed into a specific axle/suspension system and vehicle frame, which is time consuming and costly.

Moreover, the non-adjustability of such prior art rebound stops also presents problems after installation. More particularly, it is understood that maintaining the proper length of the rebound stop chain or strap after installation is very important. This is because the rebound distance of the axle/suspension system can change after installation. Proper functioning of a prior art rebound stop after installation is dependent upon a measurement called "rebound margin" remaining generally unchanged. Rebound margin is defined as the difference in length between the full extension position of the shock absorber without a rebound stop, which is the longer length, and the full extension position of the shock absorber with a rebound stop installed, which is the shorter length. The rebound margin preferably is very small because rebound stops optimally should positively stop the rebound or downward travel of the axle/suspension system just before the shock absorbers are fully extended and experience the impact of rebound, while sacrificing as little as possible of the travel of the shock absorbers so that the cushioning function of the shock absorbers also can be maximized.

If, however, the vehicle alignment, or fore-aft position of the axle/suspension system, is adjusted, either by the manufacturer, or after the vehicle has been in use and is being serviced, the preferred small rebound margin can be significantly reduced or even eliminated, depending on the initial amount of the rebound margin. Other factors that also can adversely effect rebound margin include normal variations in manufacturing tolerances of shock absorber mounting bracket locations, and wear and elongation of the rebound stop components. If the rebound margin is eliminated as a result of such factors, then the shock absorbers are subjected to the full impact of rebound, and consequently, the purpose of the rebound stop is defeated and the life of the shock absorbers could be significantly reduced or damage and failure of the shock absorbers could occur. Failure of the shock absorbers in turn could result in damage to and/or failure of other components of the axle/suspension system.

The present invention solves the above-described problems associated with prior art non-adjustable rebound stops, through the use of an adjustable rebound stop, which is easy to install, economical and simple to use.

SUMMARY OF THE INVENTION

Objectives of the invention include providing a rebound stop which can be utilized on a variety of axle/suspension systems without customization.

Another objective of the present invention includes providing a rebound stop which is adjustable after installation to minimize the possibility of elimination of the rebound margin after the vehicle has been in use.

Still another objective of the invention is to provide a rebound stop which is easy to install, economical and simple to adjust.

These objectives and advantages are obtained by the rebound stop assembly for limiting the downward rebound travel distance of a vehicle axle/suspension system of the present invention, the general nature of which may be stated as including the axle/suspension system including a pair of transversely spaced suspension assemblies, each one of the pair of suspension assemblies including a longitudinally extending beam, the beams each being pivotally mounted on and depending from a frame of the vehicle, the beams further capturing a transversely extending axle having at least one wheel mounted on each end of the axle, one of the rebound stop assemblies being incorporated into each one of the pair of suspension assemblies, each one of the rebound stop assemblies including elongated vertically extending stop means, a first end of the stop means being immovably attached to a selected one of the beam and the axle, and a second end of the stop means being immovably attached to the vehicle frame, wherein the improvement comprises means for movably adjusting the position of each one of the stop means at a selected one of the stop means first and second ends, for selectively predetermining the downward travel distance of each one of the suspension assemblies and the axle.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
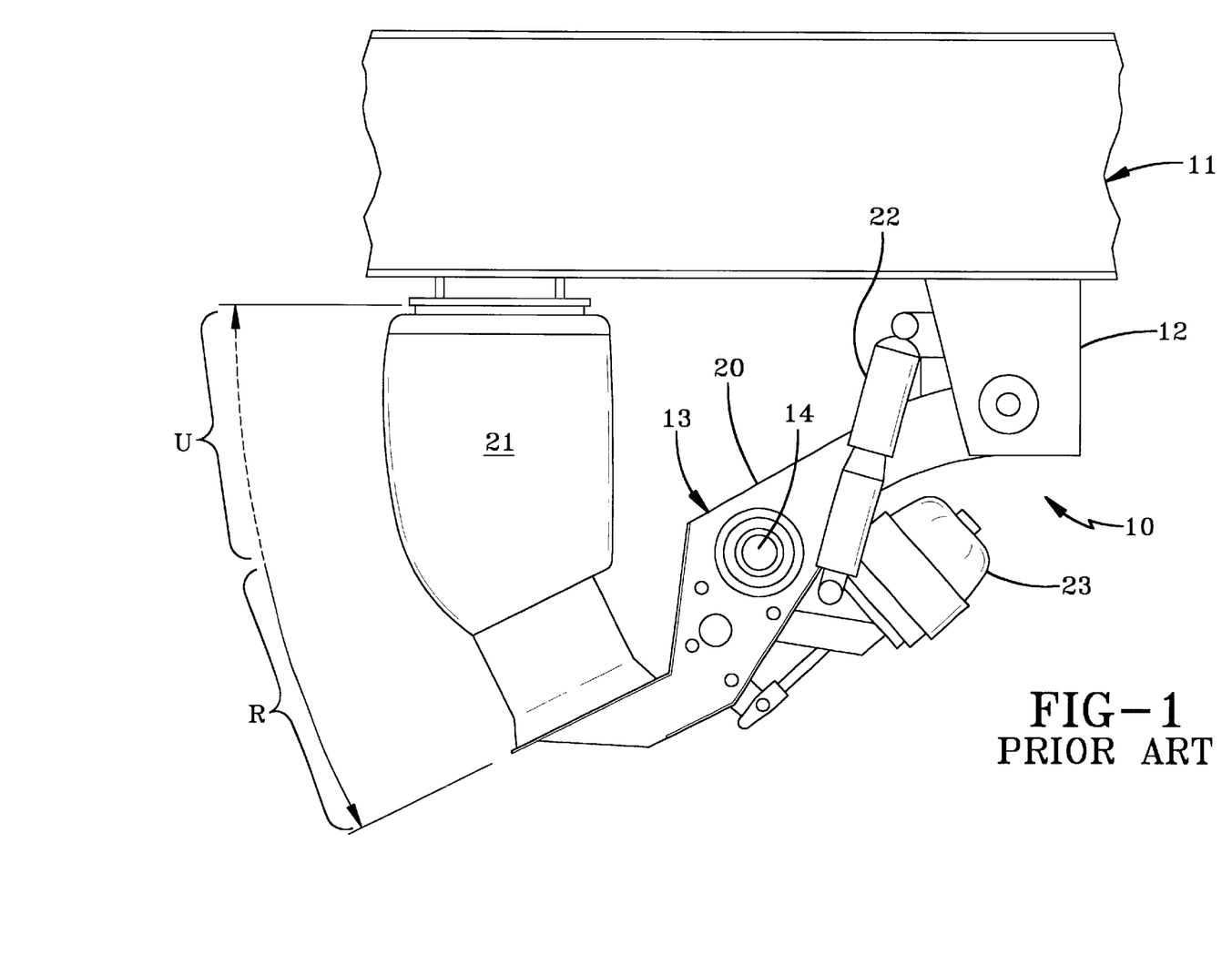
FIG. 1 is a fragmentary side view of a vehicle frame incorporating a suspension assembly without a rebound stop accessory, and showing the suspension assembly and axle that it captures in their downwardmost travel or full rebound position.

So that the environment in which both the prior art non-adjustable rebound stop and the adjustable rebound stop of the present invention are utilized can best be understood, a typical axle/suspension system now will be described. An axle/suspension system, which is free of any rebound stop accessory, is shown in FIG. 1 and is indicated generally at 10. Axle/suspension system 10 conventionally is mounted on a frame 11 of a vehicle such as a semi-trailer or other heavy-duty vehicle (not shown), via a pair of hangers 12 (only one shown) which form a depending part of the frame. Hangers 12 are transversely spaced apart on vehicle frame 11. Inasmuch as each axle/suspension system 10 mounted on vehicle frame 11 comprises a pair of suspension assemblies 13 which are each mounted on a respective one of hangers 12 and the frame and capture an axle 14 which extends transversely between the suspension assemblies, only one of the suspension assemblies will be described hereinbelow. Also, only the major components of each suspension assembly 13 will be cited for aiding in the description of the environment in which the prior art and the present invention rebound stops operate.

Each suspension assembly 13 is suspended from its respective hanger 12 of vehicle frame 11. More particularly, each suspension assembly 13 includes a suspension beam 20 which is pivotally mounted on hanger 12 via a beam bushing assembly (not shown) in a manner well known to those having ordinary skill in the suspension art. An air spring 21 is suitably mounted on and extends between the upper surface of the rearwardmost end of suspension beam 20 and a bottom surface of frame 11 to complete the mounting of the beam on the frame. A shock absorber 22 extends between and is securely mounted on suspension beam 20 at any suitable location and hanger 12 of frame 11. Other components of suspension assembly 20, mentioned herein only for the sake of relative completeness, include an air brake 23 and a height control valve (not shown). As noted above, axle 14 extends transversely between and is captured in the pair of spaced-apart suspension beams 20 of axle/suspension system 10. Wheels (not shown) are mounted on each end of axle 14.

Figure 2:
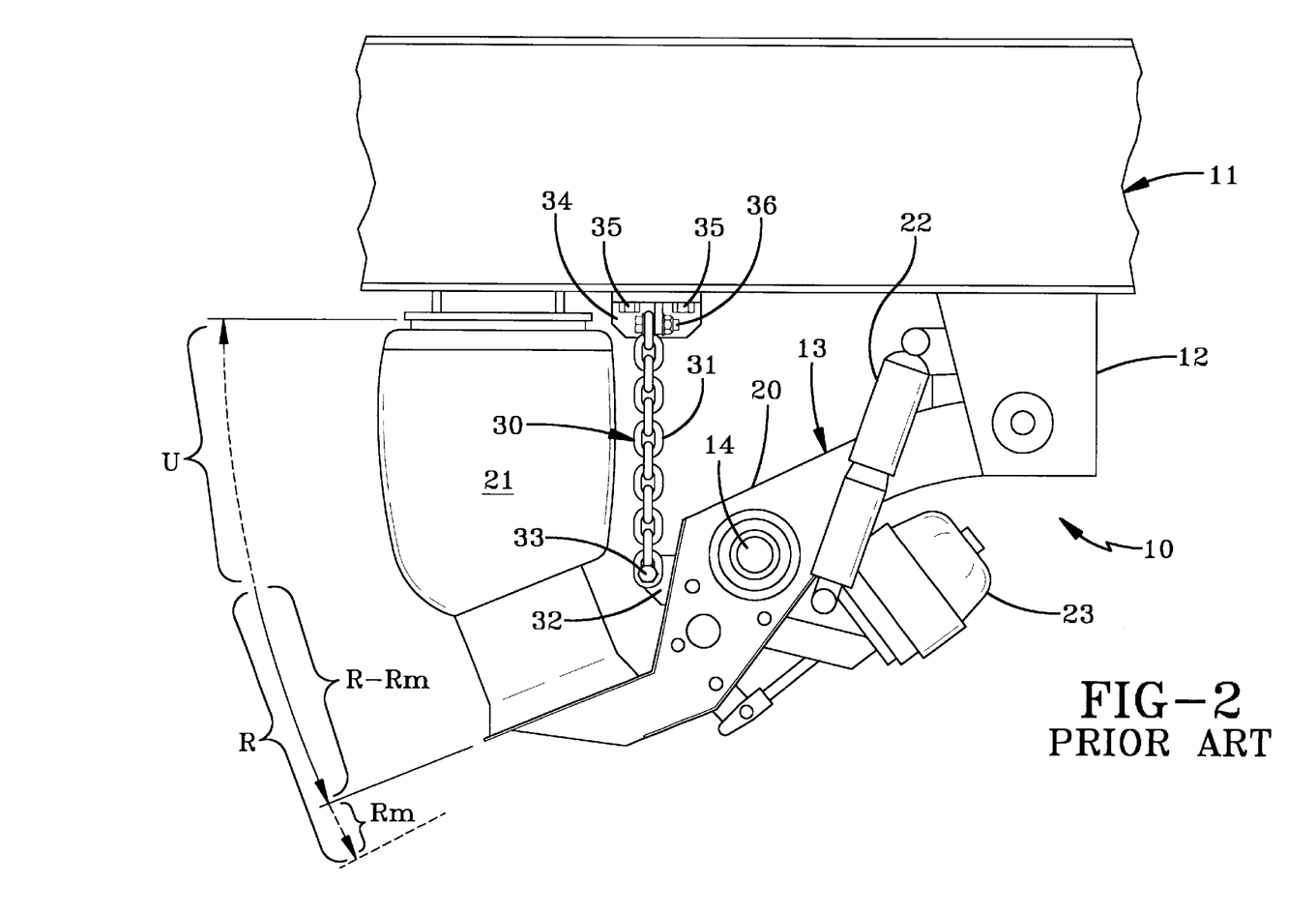
FIG. 2 is a view similar to FIG. 1, but showing a prior art non-adjustable rebound stop installed on the suspension assembly and vehicle frame, and further showing the suspension assembly and axle in their full rebound position as shortened over that shown in FIG. 1 by a distance Rm due to the presence of the rebound stop.

So that the adjustable rebound stop of the present invention can best be understood, a prior art rebound stop 30 is shown in FIG. 2 mounted on suspension assembly 13. Conventional prior art rebound stop 30 is comprised of a ½-inch chain 31, which extends between and is securely immovably fastened to vehicle frame 11 and suspension beam 20. It is understood that for lighter duty applications, a woven nylon strap typically is utilized instead of chain 31. More particularly, a first bracket 32 is immovably secured to an upper surface of beam 20 by any suitable means such as welds. A fastener 33 such as a bolt passes through the lowermost link of chain 31 and through an aligned opening (not shown) formed in bracket 32 to immovably attach the chain to the bracket. A second bracket 34 is attached to a bottom surface of frame 11 by any suitable means such as bolts 35. An uppermost link of chain 31 is immovably attached to second bracket 34 by a fastener such as a bolt 36, which passes through the uppermost chain link and an aligned opening (not shown) formed in the second bracket 34.

The operation of prior art rebound stop 30 now will be described. As shown in FIG. 1, suspension beam 20, during normal operation of the vehicle to which it is attached, pivots about its bushing assembly end attached to hanger 12 in an arcuate fashion as represented by a double-ended arrow. More specifically, when one or more of the wheels mounted on axle/suspension system 10 of the vehicle encounters a protrusion in the travel surface or road such as a large bump or the like, the wheel, axle 14 and suspension beam 20 attached to the axle all move in an upward direction as shown by dashed portion U of the double-ended arrow. Conversely, when the wheel encounters a depression in the travel surface such as a pothole, the wheel, axle 14 and suspension beam 20 all move downwardly as represented by solid portion R of the double-ended arrow. Since axle/suspension system 10 shown in FIG. 1 lacks a rebound stop accessory, when suspension beam 20 is in full rebound as represented by solid portion R of the arrow, the primary structure preventing continued downward movement of the beam and axle 14 beyond the point shown is shock absorber 22. Although shock absorber 22 functions satisfactorily as a positive stop when suspension assembly 13 is in full rebound, the life of the shock absorber is significantly reduced due to its being subjected to the full impact of rebound, and failure of the shock absorber can even occur. In severe cases, damage to air spring 21, beam 20 and/or vehicle frame 11 could even occur as well.

Thus, in order to minimize the rebound impact loads imparted on shock absorber 22, which in turn will improve the life span of the shock absorbers attached to suspension assemblies 13 of axle/suspension system 10, prior art rebound stop 30 of the type shown in FIG. 2 often is utilized as a suspension assembly accessory. As best represented by the double-ended arrow in FIG. 2, rebound stop 30 does not affect the upward motion of axle/suspension system 10 as illustrated by dashed portion U of the arrow. However, rebound stop 30 does create a rebound margin in the downward direction. More specifically, rebound margin, shown as Rm, is defined as the difference in length between a fully extended shock absorber without a rebound stop, as represented by R, and the length of the fully extended shock absorber when the rebound stop is in use, as represented by R-Rm. Although it clearly can be seen in FIG. 2 that rebound stop 30 functions satisfactorily in preventing full impact loading on shock absorber 22 when suspension beam 20 is in rebound a distance of R-Rm, the prior art rebound stop has several disadvantages associated with its use.

First, since prior art rebound stop 30 is non-adjustable, the specifications of the rebound stop for a certain axle/suspension system must be determined to close tolerances. In particular, this involves determining the correct length of chain 31, or a strap in those applications that utilize a woven nylon strap, as well as the exact locations of attachment of the chain or strap to suspension beam 20 and vehicle frame 11. The length and location specifications are important in determining the final rebound position, R-Rm, of each suspension assembly 13. Often these specifications are incorporated at the design stage of axle/suspension system 10 and vehicle frame 11, or alternatively, are determined by experimentation after design of the axle/suspension system and frame are complete, which can be time-consuming and costly.

Second, when a prior art rebound stop 30 is optimally installed, rebound margin Rm preferably is very small, since when properly functioning, the rebound stop acts as a positive stop just prior to shock absorber 22 experiencing the full impact of rebound, without sacrificing a significant amount of the shock absorber travel. However, since repositioning or adjustment of rebound stop 30 after installation is not possible, if alignment of the vehicle is adjusted, either by the manufacturer, or at a later time after the vehicle is in service, rebound margin Rm can be significantly reduced or even eliminated, depending on the initial amount of the margin. Other factors that can affect the value of rebound margin Rm are normal variations within the manufacturing tolerances of the locations of the mounting brackets for shock absorber 22, and wear and elongation of the components of rebound stop 30 such as chain 31. If rebound margin Rm is eliminated, then shock absorber 22 is subjected to the full impact of rebound R, and consequently, the purpose of the rebound stop is defeated.

The problems of determination of the correct length of prior art rebound stop 30, as well as its mounting locations on vehicle frame 11 and suspension beam 20, can be eliminated by utilizing adjustable rebound stop 50 of the present invention.

The construction and mounting of adjustable rebound stop 50 now will be described. The adjustable rebound stop of the present invention is shown in FIGS. 3–6 and is indicated at 50. Rebound stop 50 includes a ½-inch diameter chain 51 which can include varying numbers of links depending on the length of the chain that is desired for various applications. More specifically, although the length of chain 51 can be varied depending upon the particular suspension assembly application, it is contemplated that for most applications within a range of similar suspension assembly types, a single chain length can be utilized. However, for dissimilar suspension assembly types, it is contemplated that other chain lengths will be specified.

Figure 3:
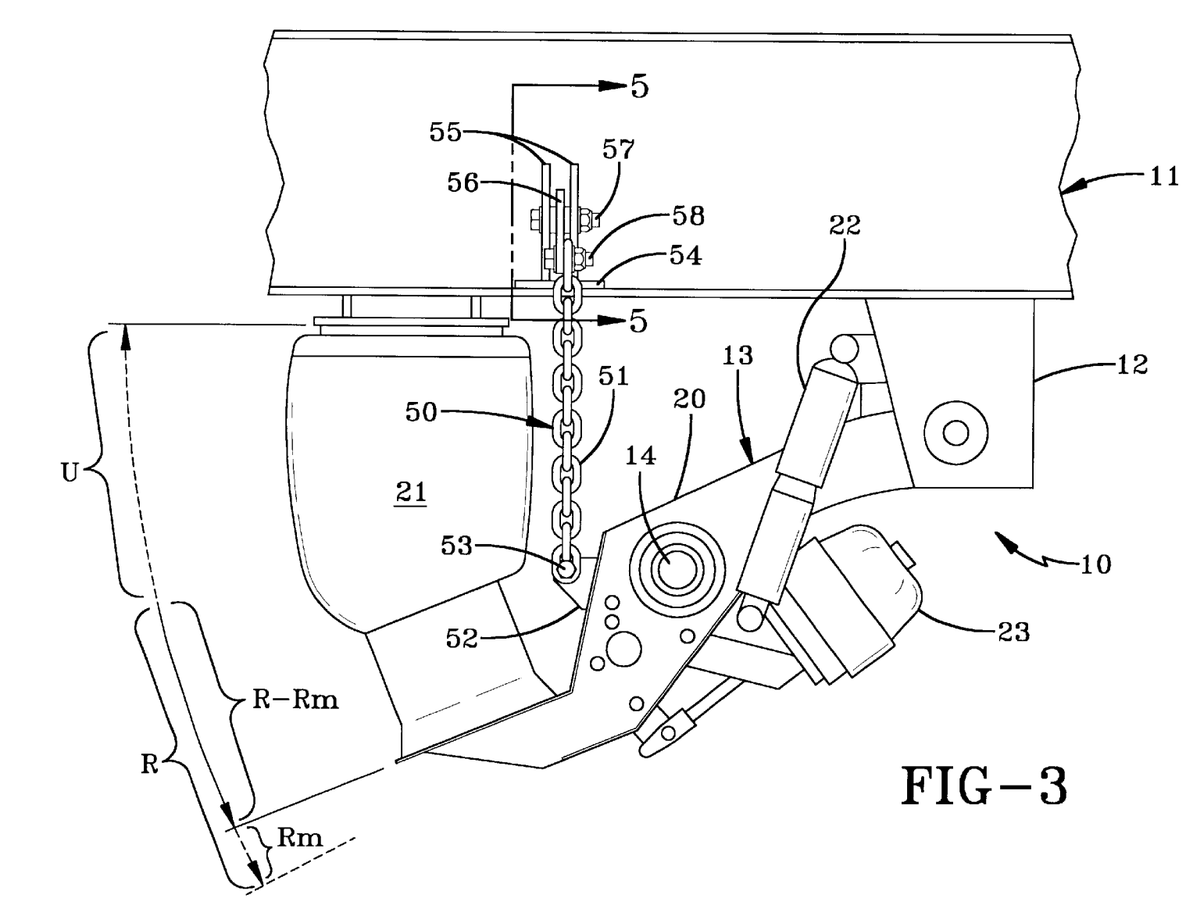
FIG. 3 is a view similar to FIG. 2, but showing the adjustable rebound stop of the present invention installed on the suspension assembly and vehicle frame.

As best shown in FIG. 3, a first bracket 52 is attached to an upper surface of a generally central portion of beam 20 by any suitable means such as welds, bolts, or the like (not shown). The lowermost link of chain 51 is aligned with an opening (not shown) formed in bracket 52, and a fastener 53 such as a bolt or other means is passed through the lowermost link and the aligned opening to immovably attach chain 51 to bracket 52. A second bracket 54 is horizontally disposed and is attached to a bottom horizontal flange 15 of vehicle frame 11, such as by welds or other suitable means (not shown). A pair of vertically extending, spaced-apart and parallel clamping plates 55 are attached to the upper surface of second bracket 54 by welds, and the outbound edge of each of the plates abuts a vertical web plate 16 of frame 11. Each plate 55 is formed with an opening (not shown) which is aligned with the opening of the other plate. An adjustment arm or cam 56 is formed with an opening (not shown), and the cam is disposed between plates 55 so that the cam opening also is aligned with the aligned openings of the plates. A cam pivot bolt 57 is passed through the three aligned openings to pivotally capture cam 56 between plates 55. A portion of cam 56 which extends inboardly away from plates 55 and vehicle frame 11 is formed with an opening (not shown). An uppermost link of chain 51 is aligned with the cam opening and fastening means such as a bolt 58 is passed through the link and the aligned cam opening to immovably secure the upper end of chain 51 to cam 56.

Figure 4:
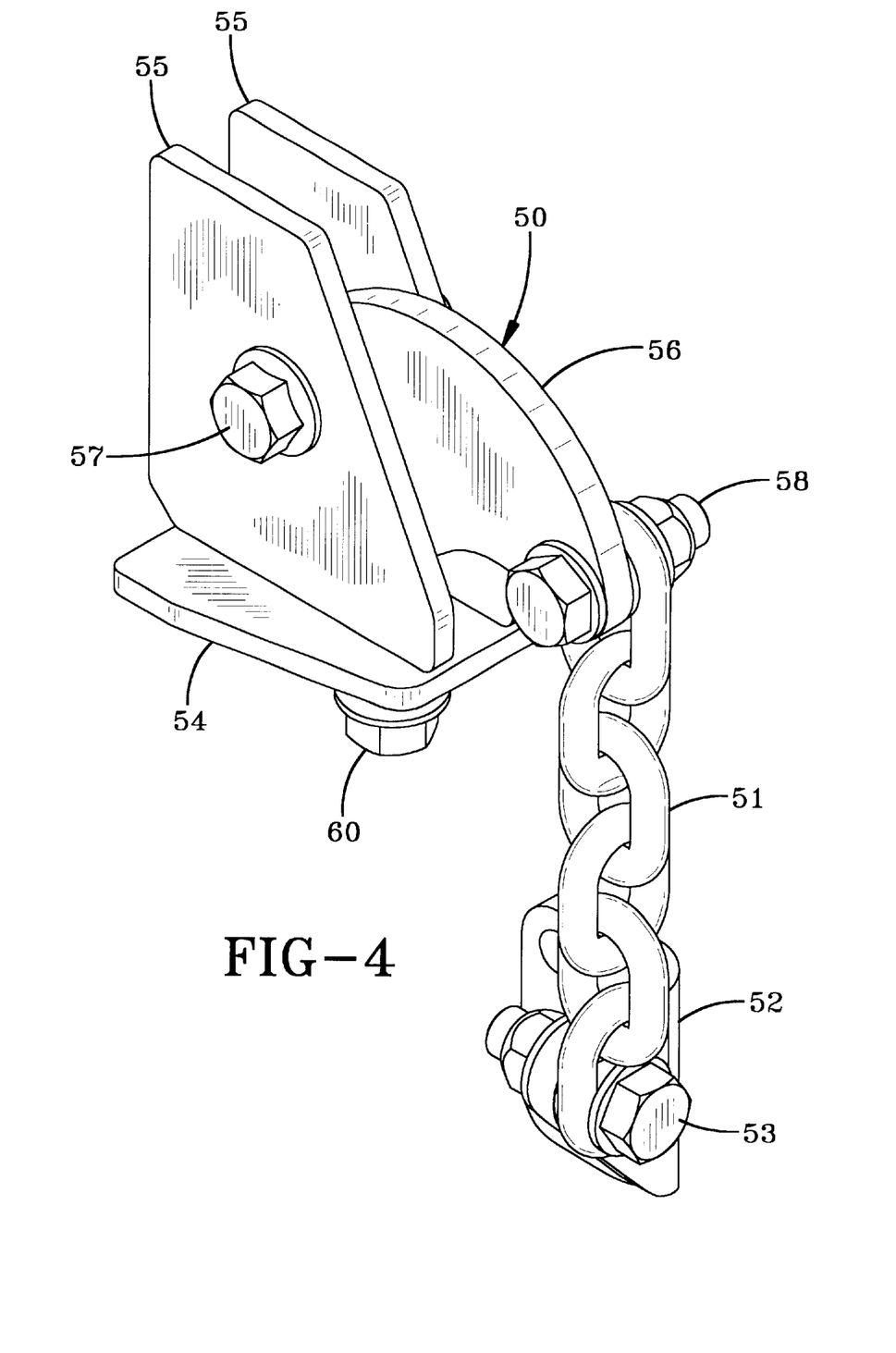
FIG. 4 is a greatly enlarged perspective view of the present invention adjustable rebound stop prior to installation on a suspension assembly and vehicle frame.
Figure 5:
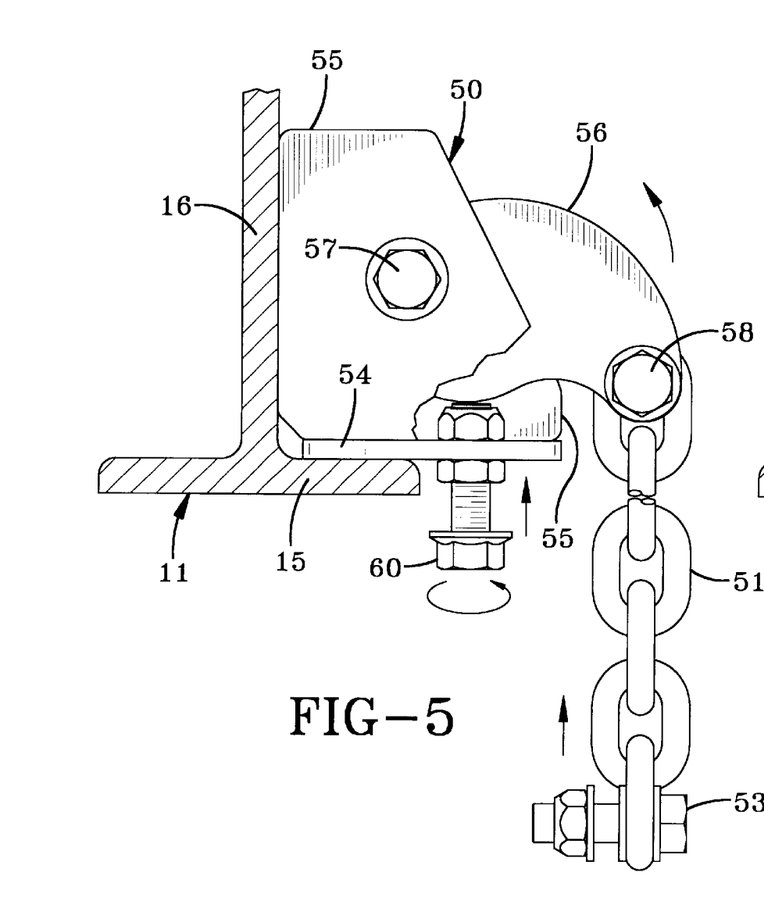
FIG. 5 is a greatly enlarged fragmentary view looking in the direction of lines 5—5 of FIG. 3, with portions broken away, showing the adjustable rebound stop in its fully extended position.
Figure 6:
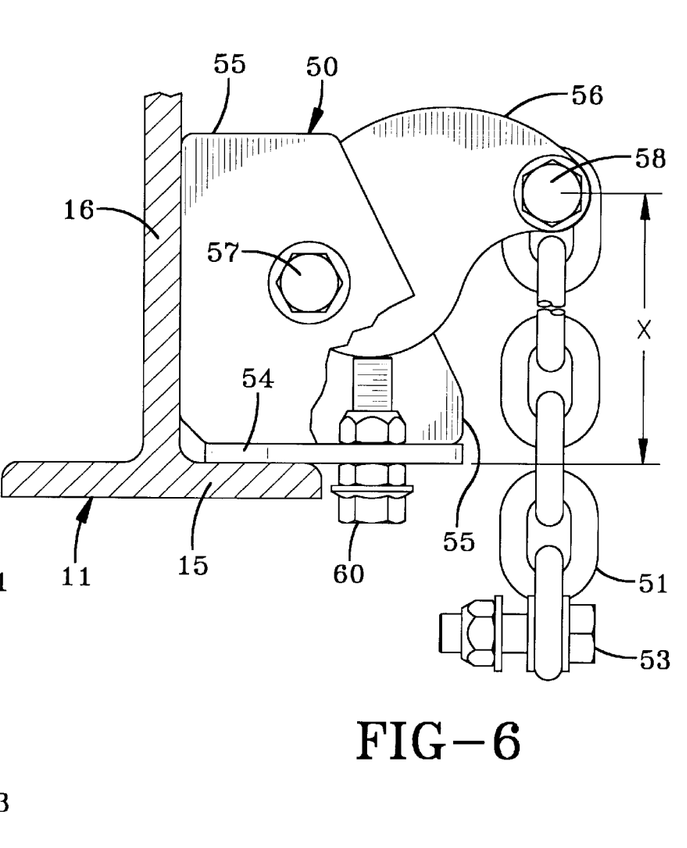
FIG. 6 is a view similar to FIG. 5, but showing the adjustable rebound stop in its fully retracted position.

In accordance with one of the important features of the present invention, and as best shown in FIGS. 4–6, an adjustment bolt 60 passes through an opening (not shown) formed in second bracket 54, and adjustably engages cam 56, the operation of which will be described in detail immediately below.

Upon installation of axle/suspension system 10 on a vehicle, including adjustable rebound stop 50 of the present invention as an accessory to each suspension assembly 13 of the axle/suspension system, adjustment of rebound margin Rm can be quickly and easily achieved by turning adjustment bolt 60 utilizing a wrench. Although bolt 60 preferably is right-hand threaded, a left-hand threaded bolt could be utilized if desired, with the result that all adjustment directions described immediately below for the right-hand threaded bolt would be reversed for the left-hand threaded bolt to effect the same adjustment of rebound stop 50. As shown by arrows in FIG. 5, upon clockwise rotation of adjustment bolt 60, the top of the bolt moves in the direction of cam 56 and bears on the curved surface of the cam causing the cam to rotate about pivot bolt 57 and pull the chain upward to a position as shown in FIG. 6, which results in increase of rebound margin Rm represented in FIG. 3. Each full turn of adjustment bolt 60 results in approximately ½-inch of movement of chain 51, with the full range of adjustment of the chain of about 4 inches represented by distance X in FIG. 6, being achieved in about 8 turns of the bolt. When the desired rebound margin Rm is selected, pivot bolt 57 then is tightened, causing plates 55 to clamp onto and immovably captivate adjustment cam 56. If it is desired to decrease rebound margin Rm by lowering chain 51, the above procedure would be reversed. It is understood that such adjustment can be achieved at the manufacturing stage or after the vehicle is in use.

Thus, it can be seen that locating rebound stop 50 of the present invention is greatly simplified, since in view of the 4 inch range of adjustment, brackets 54 and 52 can be located at almost any reasonable fore-aft location on bottom surface 15 of frame 11 and the upper surface of suspension beam 20, respectively. The inboard-outboard location of rebound stop 50 is automatically determined simply by abutting the outboard edges of clamping plates 55 against vertical web plate 16 of frame 11, before welding the rebound stop to the frame. Clearance automatically exists between the inboardmost edge of vehicle frame 11 and the inboardmost end of cam 56 so that the cam and chain 51 can freely operate without interference from the frame. Customization of rebound stop 50 is unnecessary, because the stop is designed to fit, with proper clearance for adjustment bolt 60 and chain 51, into the widest frame bottom horizontal surface likely to be encountered in a heavy-duty vehicle frame, of about six inches. It is understood that rebound stop 50 can be used with frames having the I-beam shape shown in FIGS. 5–6, or with vehicle frames having other shapes such as C-shaped. It can also be appreciated that that adjustable rebound stop 50 also will serve to allow quick and simple adjustment of the rebound stop after the vehicle is in use because adjustment bolt 60 is easily accessible on the vehicle frame underside.

Figure 3A:
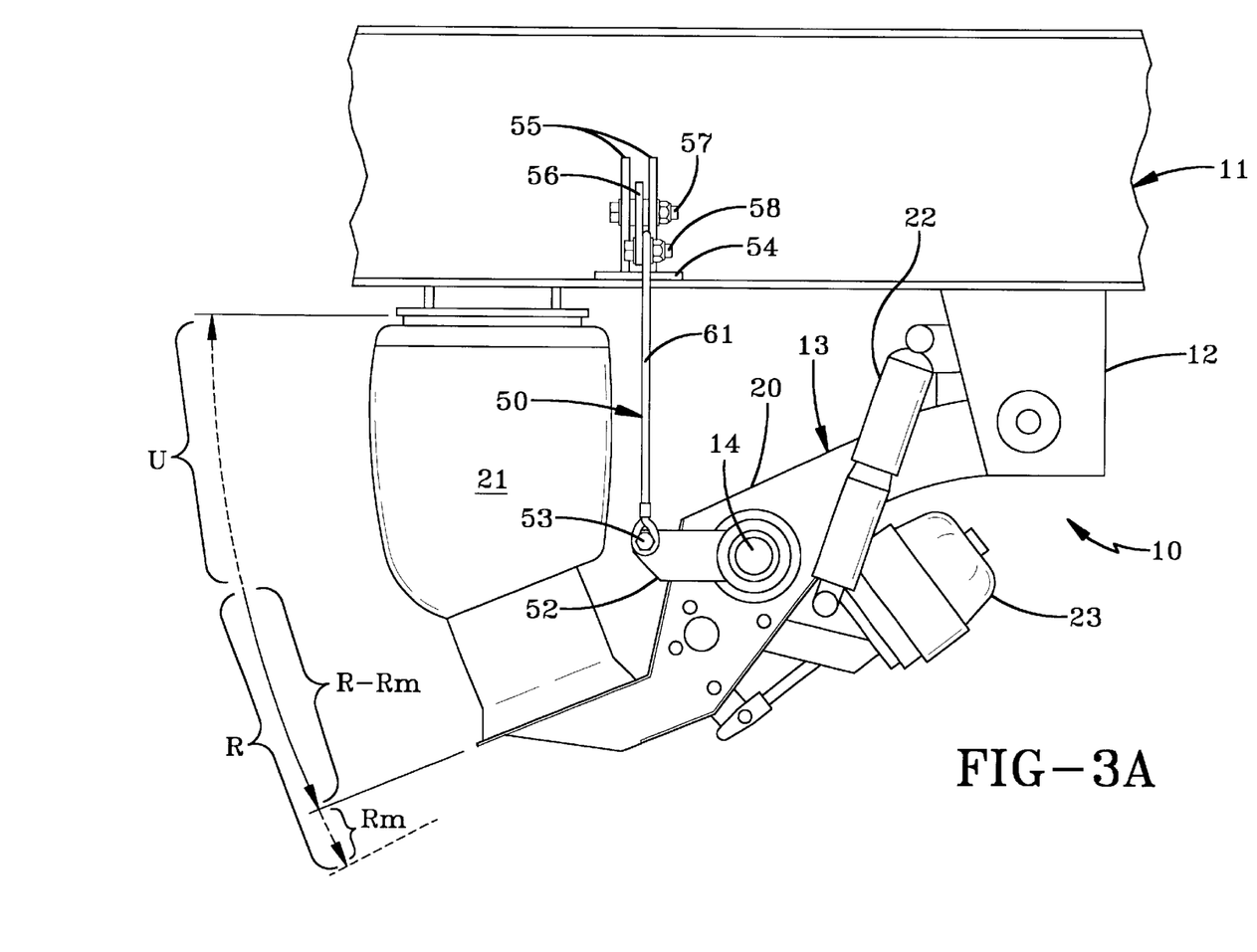

Although the preferred embodiment of adjustable rebound stop 50 of the present invention is particularly and distinctly shown in the drawings and described hereinabove, it is contemplated that a woven nylon strap schematically represented at 61 in FIG. 3A could be substituted for chain 51 in lighter-duty applications, if desired, without affecting the overall concept of the invention. It is further contemplated that means for achieving adjustment of rebound stop 50, and in particular chain 51 of the rebound stop, other than cam 56 and adjustment bolt 60 described hereinabove, could be utilized. For example, chain 51 could be replaced by a heavy-duty metal cable such as aircraft cable (schematically at 61) and attached at its upper end to a wheel or drum which is adjusted by a bolt or other means such as a small electric motor or the like. As schematically shown in FIG. 3A, it is understood that alternative strap or cable 61, as well as chain 51, could be attached at its lower end to axle 14 instead of beam 20. It also is contemplated that the adjustment means for rebound stop 50 of the present invention could be located at the end of chain 51 adjacent to suspension beam 20 without affecting the overall concept of the present invention.

Accordingly, the improved adjustable rebound stop for axle/suspension systems is simplified, provides an effective, safe inexpensive, and efficient structure which achieves all the enumerated objectives, provides for eliminating difficulties encountered with prior rebound stops, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved adjustable rebound stop is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A rebound stop assembly for limiting the downward rebound travel distance of a vehicle axle suspension system, said axle suspension system including a pair of transversely spaced suspension assemblies, each one of said pair of suspension assemblies including a longitudinally extending beam, said beams each being pivotally mounted on and depending from a frame of said vehicle, said beams further capturing a transversely extending axle having at least one wheel mounted on each end of said axle, one of said rebound stop assemblies being incorporated into each one of the pair of suspension assemblies, each one of said rebound stop assemblies including elongated vertically extending stop means, a first end of said stop means being immovably attached to a selected one of said beam and said axle, and a second end of the stop means being immovably attached to said vehicle frame, wherein the improvement comprises:

a) means for movably adjusting the position of each one of said stop means at a selected one of the stop means first and second ends, said stop means position being selectively adjustable to a plurality of positions between an uppermost and a lowermost position, for selectively predetermining the downward travel distance of each one of said suspension assemblies and said axle.

2. The rebound stop assembly of claim 1, in which said adjustment means is an adjustment bolt rotatably mounted on a bracket assembly which in turn pivotally captures a cam; in which said adjustment bolt bears on said cam; and in which said stop means is immovably attached to said cam at a selected one of its first and second ends.

3. The rebound stop assembly of claim 2, in which said adjustment means bracket assembly is immovably mounted on a lower portion of said vehicle frame; and in which movement of said cam by rotating said adjustment bolt selectively adjusts the vertical position of said stop means relative to said vehicle frame to predetermine the downward rebound travel distance of said suspension assembly and said axle.

4. The rebound stop assembly of claim 1, in which s aid stop means is selected from the group consisting of metal chains, woven nylon straps, and metal cable.

5. A rebound stop assembly for limiting the downward rebound travel distance of a vehicle axle suspension system, said axle suspension system including a pair of transversely spaced suspension assemblies, each one of said pair of suspension assemblies including a longitudinally extending beam, said beams each being pivotally mounted on and depending from a frame of said vehicle, said beams further capturing a transversely extending axle having at least one wheel mounted on each end of said axle, one of said rebound stop assemblies being incorporated into each one of the pair of suspension assemblies, each one of said rebound stop assemblies including elongated vertically extending stop means, a first end of said stop means being immovably attached to a selected one of said beam and said axle, and a second end of the stop means being immovably attached to said vehicle frame, wherein the improvement comprises:

a) an adjustment bolt rotatably mounted on a bracket assembly which in turn pivotally captures a cam, said bolt bearing on said cam, and said stop means being immovably attached to said cam at a selected one of its first and second ends, for movably adjusting the position of each one of said stop means at a selected one of said stop means first and second ends, and for selectively predetermining the downward travel distance of each one of said suspension assemblies and said axle.

6. A rebound stop assembly for limiting the downward rebound travel distance of a vehicle axle suspension system, said axle suspension system including a pair of transversely spaced suspension assemblies, each one of said pair of suspension assemblies including a longitudinally extending beam, said beams each being pivotally mounted on and depending from a frame of said vehicle, said beams further capturing a transversely extending axle having at least one wheel mounted on each end of said axle, one of said rebound stop assemblies being incorporated into each one of the pair of suspension assemblies, each one of said rebound stop assemblies including elongated vertically extending stop means, a first end of said stop means being immovably attached to a selected one of said beam and said axle, and a second end of the stop means being immovably attached to said vehicle frame, wherein the improvement comprises:

a) an adjustment bolt rotatably mounted on a bracket assembly which in turn pivotally captures a cam, said bracket assembly being immovably mounted on a lower portion of said vehicle frame, said bolt bearing on said cam, and said stop means being immovably attached to said cam at a selected one of its first and second ends, for movably adjusting the position of each one of said stop means at a selected one of said stop means first and second ends, so that movement of said cam by rotating said adjustment bolt selectively adjusts the vertical position of said stop means relative to said vehicle frame to predetermine the downward rebound travel distance of said suspension assembly and said axle.

* * * * *